United States Patent
Brown et al.

(10) Patent No.: US 9,022,326 B2
(45) Date of Patent: May 5, 2015

(54) PIPE HOLDER AND SUPPORT

(71) Applicant: Securus, Inc., San Diego, CA (US)

(72) Inventors: Larry D. Brown, San Diego, CA (US); Virgil O'Neil, San Diego, CA (US); Dennis L. Hart, Incline Village, NV (US)

(73) Assignee: Securus, Inc., San Diego, CA (US)

( * ) Notice: Subject to any disclaimer, the term of this patent is extended or adjusted under 35 U.S.C. 154(b) by 82 days.

(21) Appl. No.: 13/840,135

(22) Filed: Mar. 15, 2013

(65) Prior Publication Data

US 2014/0263867 A1  Sep. 18, 2014

(51) Int. Cl.
*F16L 3/08* (2006.01)
*F16L 55/00* (2006.01)
*F16L 3/04* (2006.01)

(52) U.S. Cl.
CPC ............... *F16L 3/08* (2013.01); *Y10S 248/906* (2013.01)

(58) Field of Classification Search
CPC .............. F16L 3/00; F16L 3/01; F16L 3/22; F16L 3/12; F16L 3/08; F16L 5/00; H02G 3/08; H02G 3/10; H02G 3/12; H02G 3/125; H02G 3/126
USPC ............ 248/65, 73, 57, 70, 49, 56, 72, 200.1, 248/906, 220.21, 225.11, 297.21, 223.41, 248/544; 138/103, 106; 285/139.1, 139.3, 285/140.1, 322, 324; 403/408.1
See application file for complete search history.

(56) References Cited

U.S. PATENT DOCUMENTS

| | | | | |
|---|---|---|---|---|
| 2,628,799 | A * | 2/1953 | Aaby | 248/57 |
| 2,773,708 | A * | 12/1956 | Beyerle | 285/64 |
| 3,021,103 | A * | 2/1962 | Beyerle | 248/57 |
| 3,104,087 | A * | 9/1963 | Budnick et al. | 248/343 |
| 5,060,892 | A * | 10/1991 | Dougherty | 248/57 |
| 5,386,959 | A * | 2/1995 | Laughlin et al. | 248/205.1 |
| 5,934,631 | A * | 8/1999 | Becker et al. | 248/200.1 |
| 6,158,066 | A | 12/2000 | Brown et al. | |
| 6,332,597 | B1 * | 12/2001 | Korcz et al. | 248/343 |
| 6,402,096 | B1 | 6/2002 | Ismert et al. | |
| 6,467,734 | B1 * | 10/2002 | Brown et al. | 248/65 |
| 6,484,979 | B1 * | 11/2002 | Medlin, Jr. | 248/205.1 |
| 6,519,791 | B2 | 2/2003 | Randolph | |
| 6,967,284 | B1 * | 11/2005 | Gretz | 174/58 |
| 7,044,701 | B2 * | 5/2006 | Herb | 411/84 |
| 7,355,118 | B1 * | 4/2008 | Gretz | 174/58 |
| 7,498,511 | B1 | 3/2009 | Brown | |
| 7,527,225 | B1 * | 5/2009 | Schulz et al. | 248/65 |
| 7,621,487 | B2 | 11/2009 | Brown et al. | |
| 7,654,287 | B1 | 2/2010 | Metzger et al. | |
| 7,963,567 | B2 * | 6/2011 | Gallardo et al. | 285/140.1 |
| 8,141,311 | B2 | 3/2012 | Rodet | |
| 8,367,944 | B2 * | 2/2013 | Chiou | 174/520 |
| 2007/0138350 | A1 * | 6/2007 | Brown et al. | 248/65 |

(Continued)

*Primary Examiner* — Christopher Garft
(74) *Attorney, Agent, or Firm* — Stetina Brunda Garred & Brucker; Lowell Anderson

(57) ABSTRACT

A support for pipes uses a telescoping strut slidably holding an elongated insert with a threaded post extending outward from the insert, through a slot in the C-shaped cross-section of the struts. A bracket fits over the post and abuts supports opposing edges of the strut. A nut on the post clamps the parts immovably together. The bracket has a depending portion extending below the strut with an opening through which a pipe passes. Two threaded couplers with opposing ramped surfaces encircle the pipe and deform when tightened to clamp the pipe while also clamping opposing sides of the depending portion.

19 Claims, 13 Drawing Sheets

(56) References Cited

U.S. PATENT DOCUMENTS

2008/0265571 A1* 10/2008 Gallardo et al. ............. 285/235
2009/0134283 A1* 5/2009 Schulz et al. ................. 248/65
2013/0104494 A1* 5/2013 Evangelista et al. ......... 52/741.1

* cited by examiner

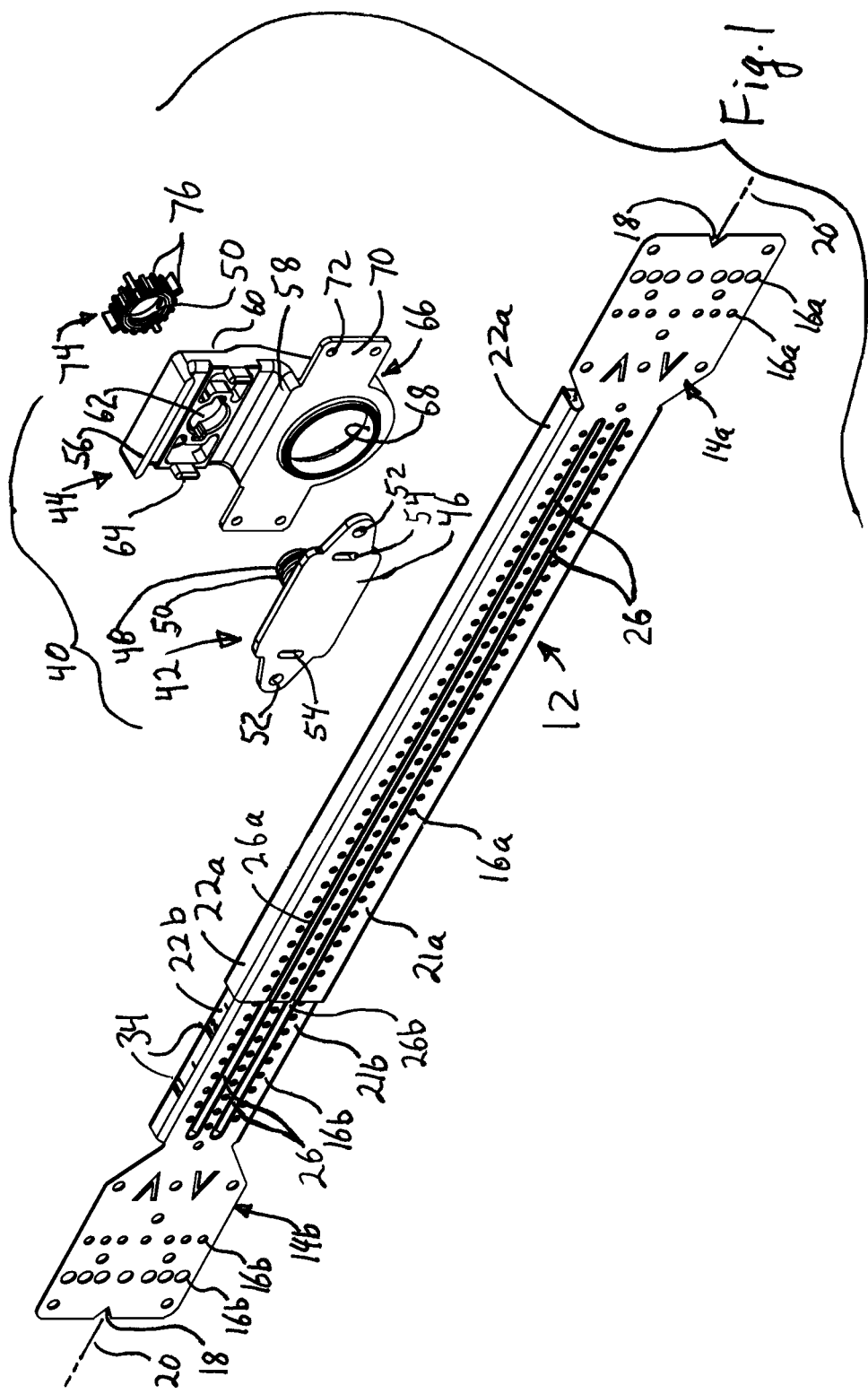

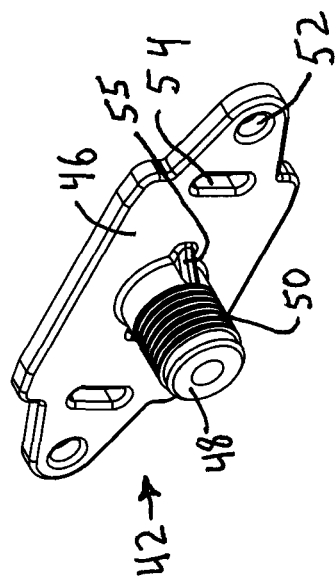
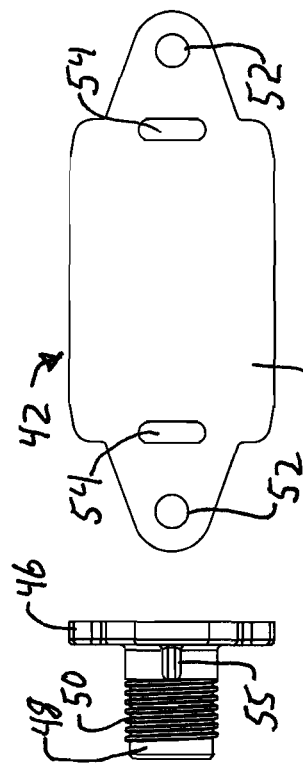
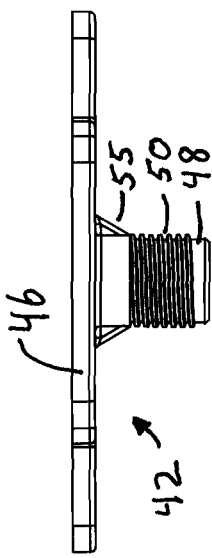
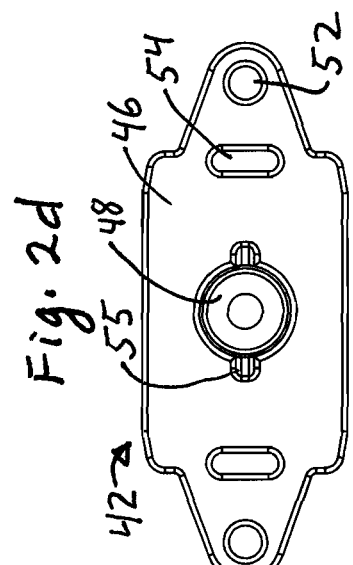
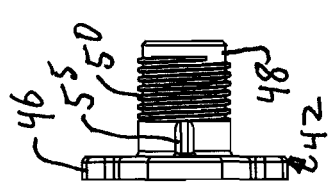
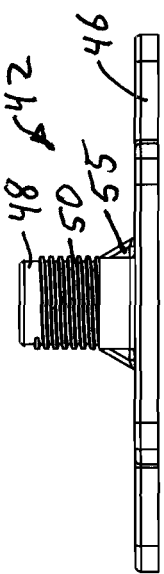

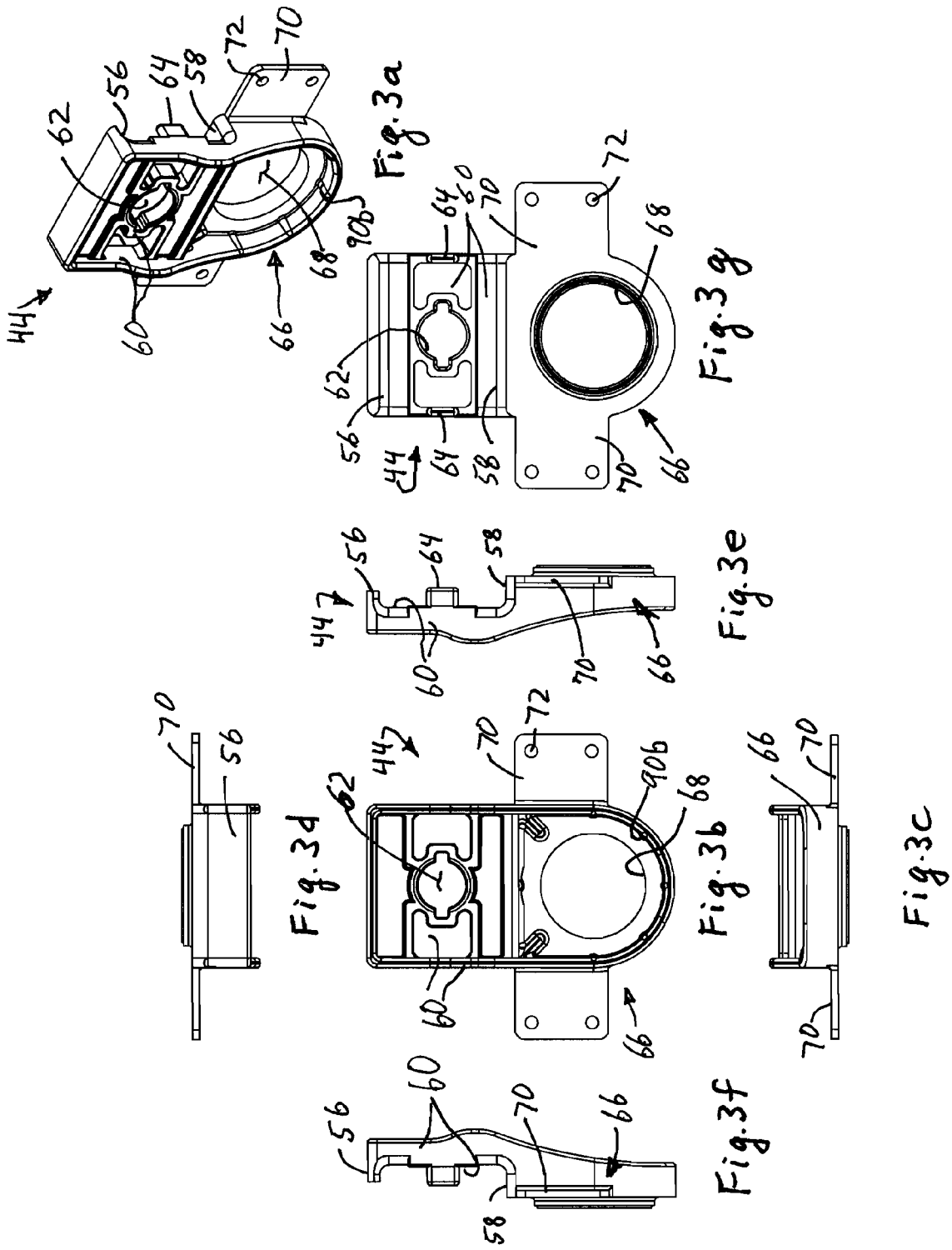

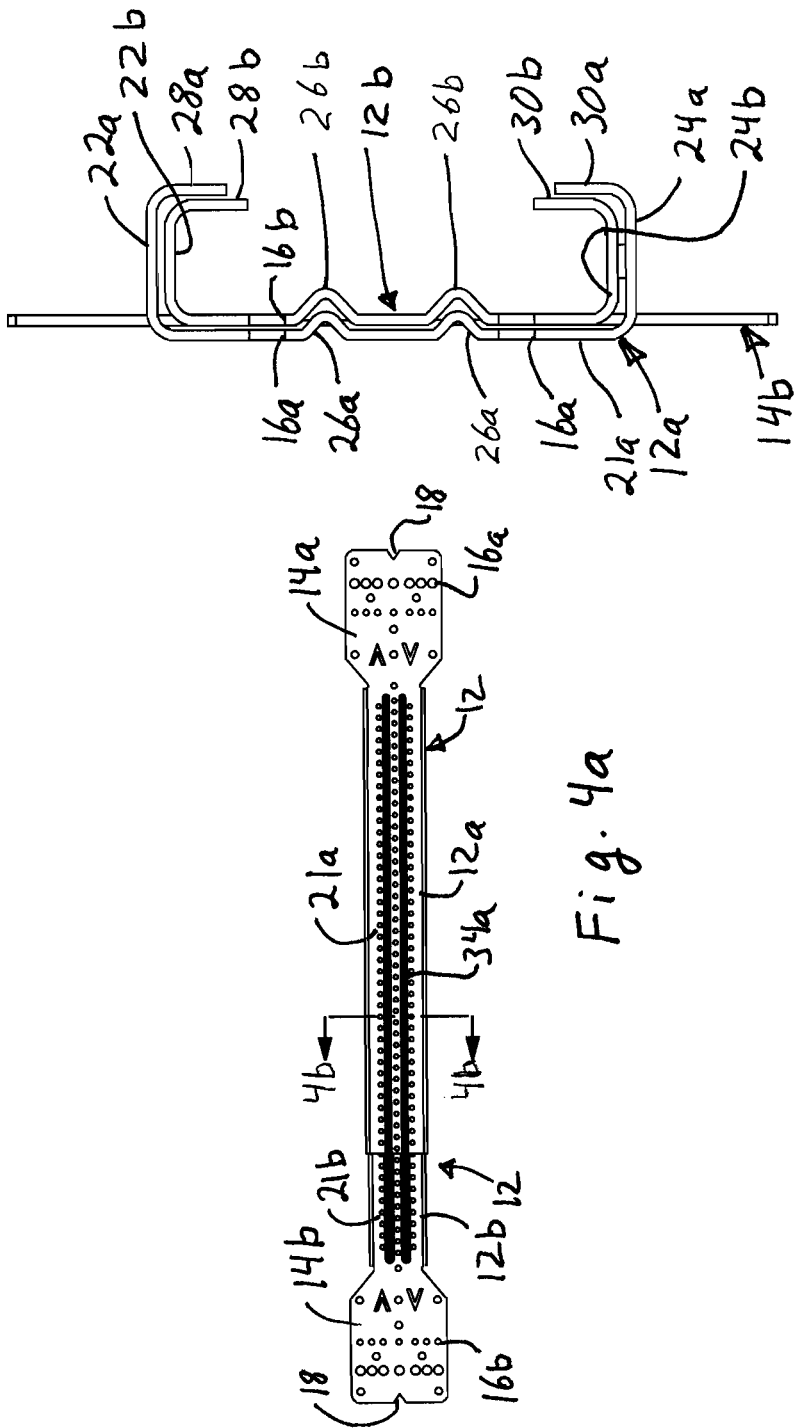

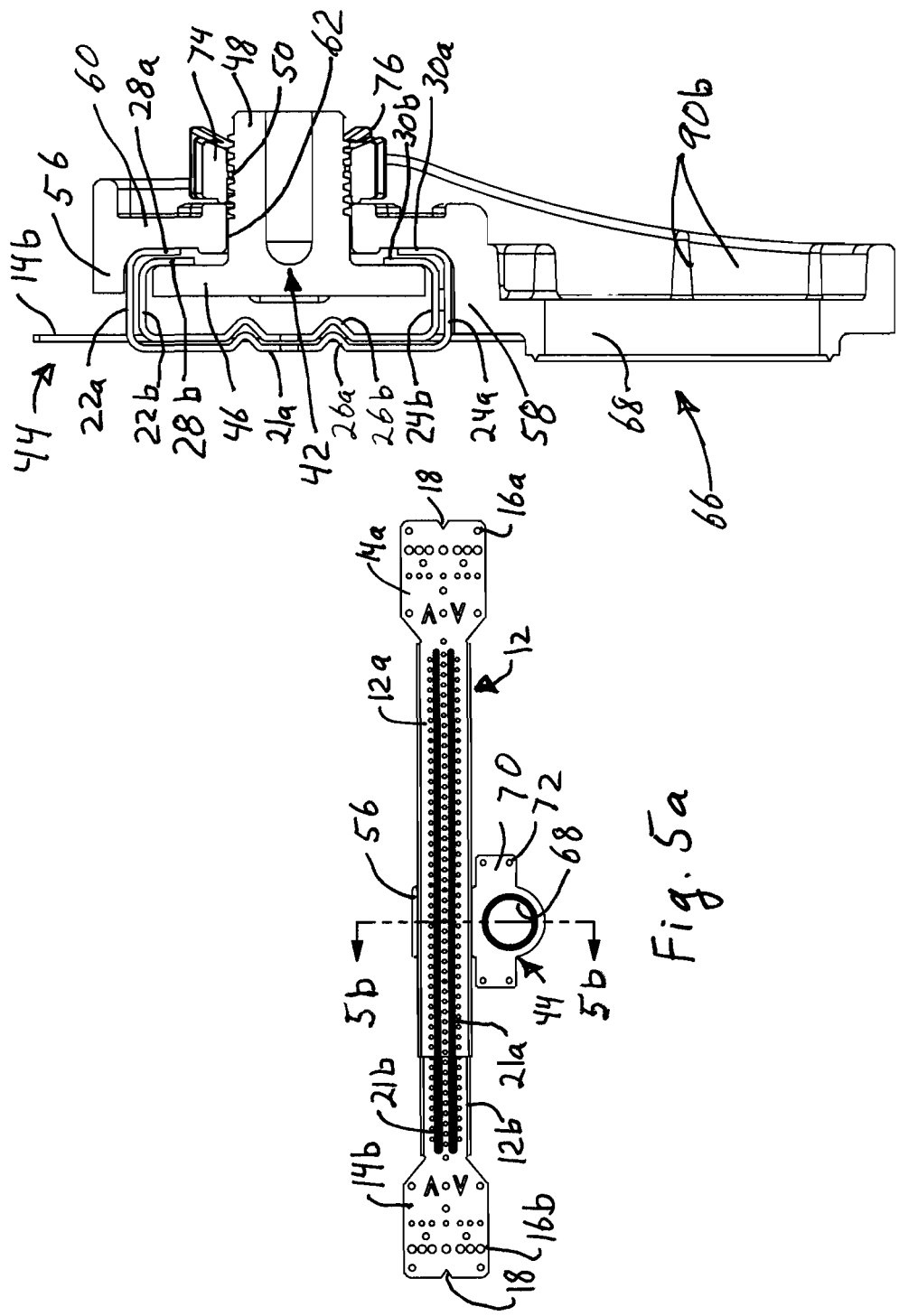

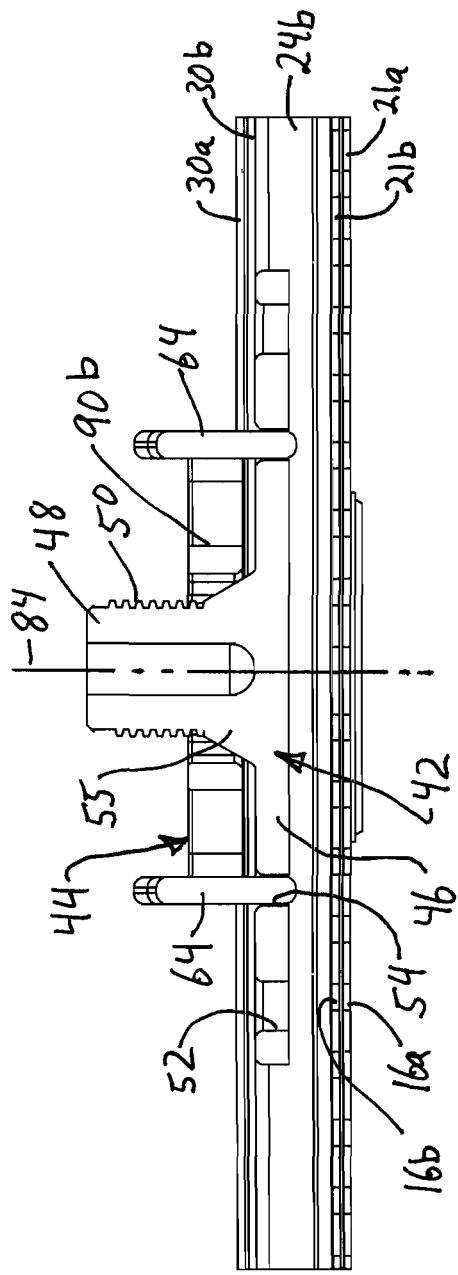
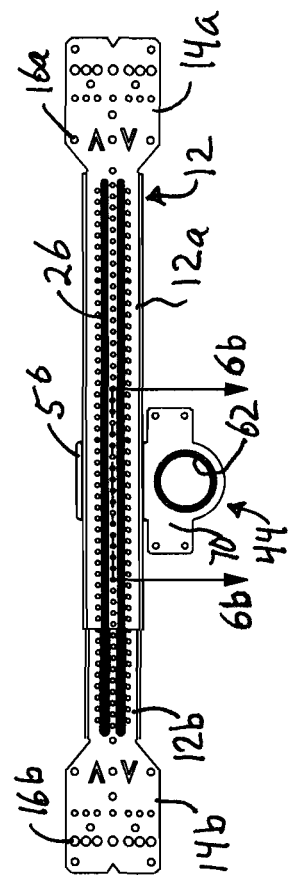
Fig. 6b
Fig. 6a

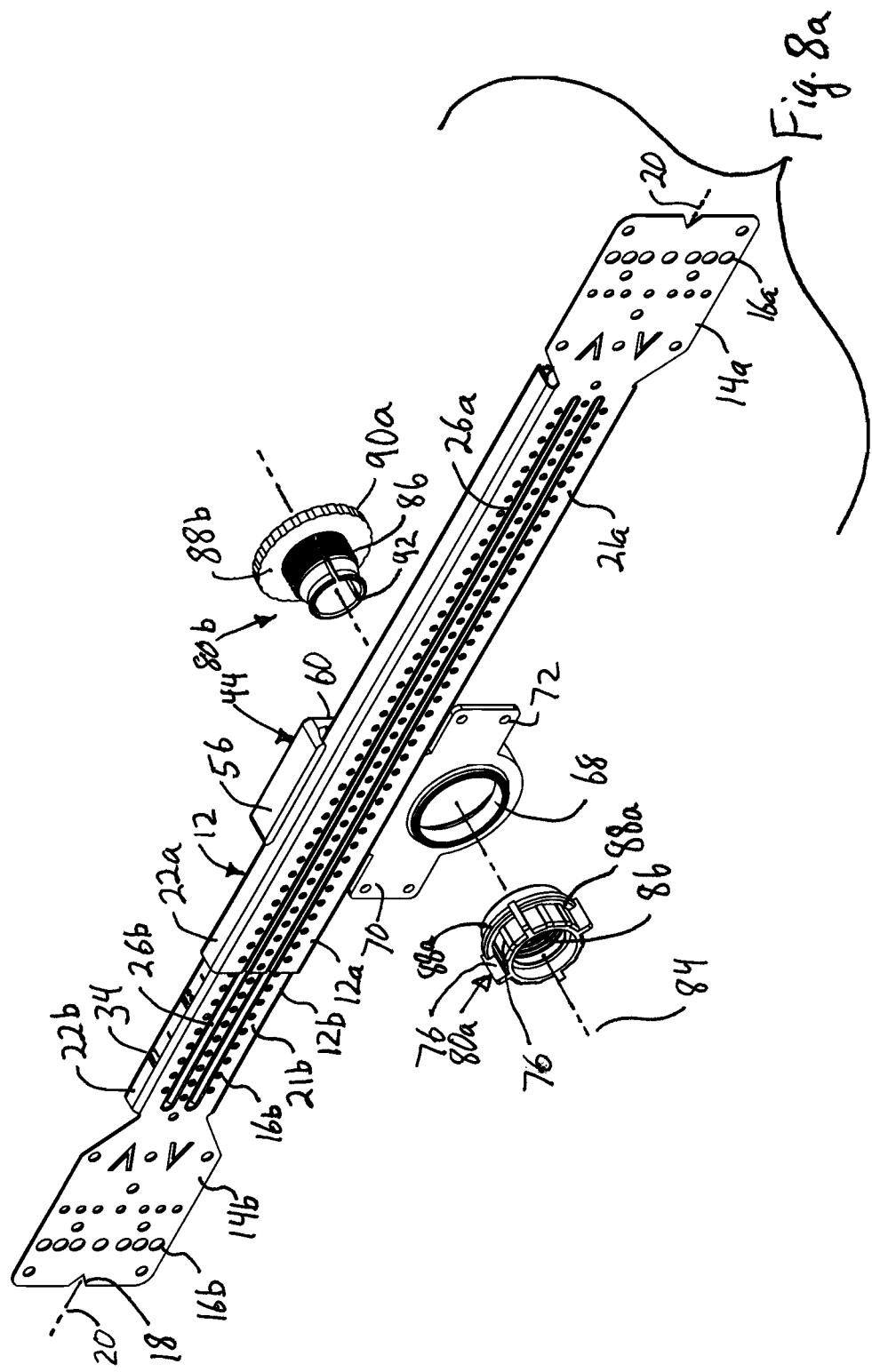

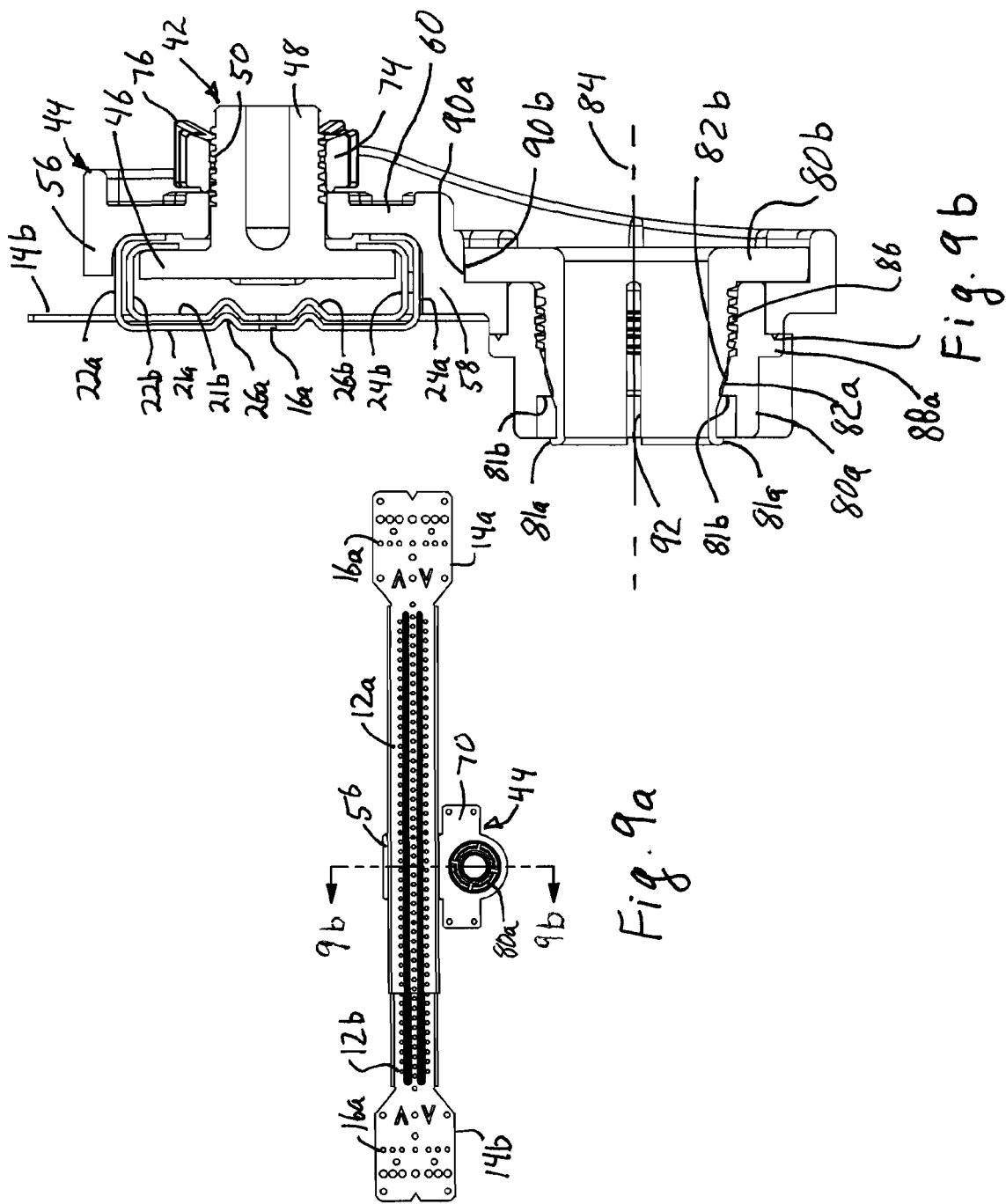

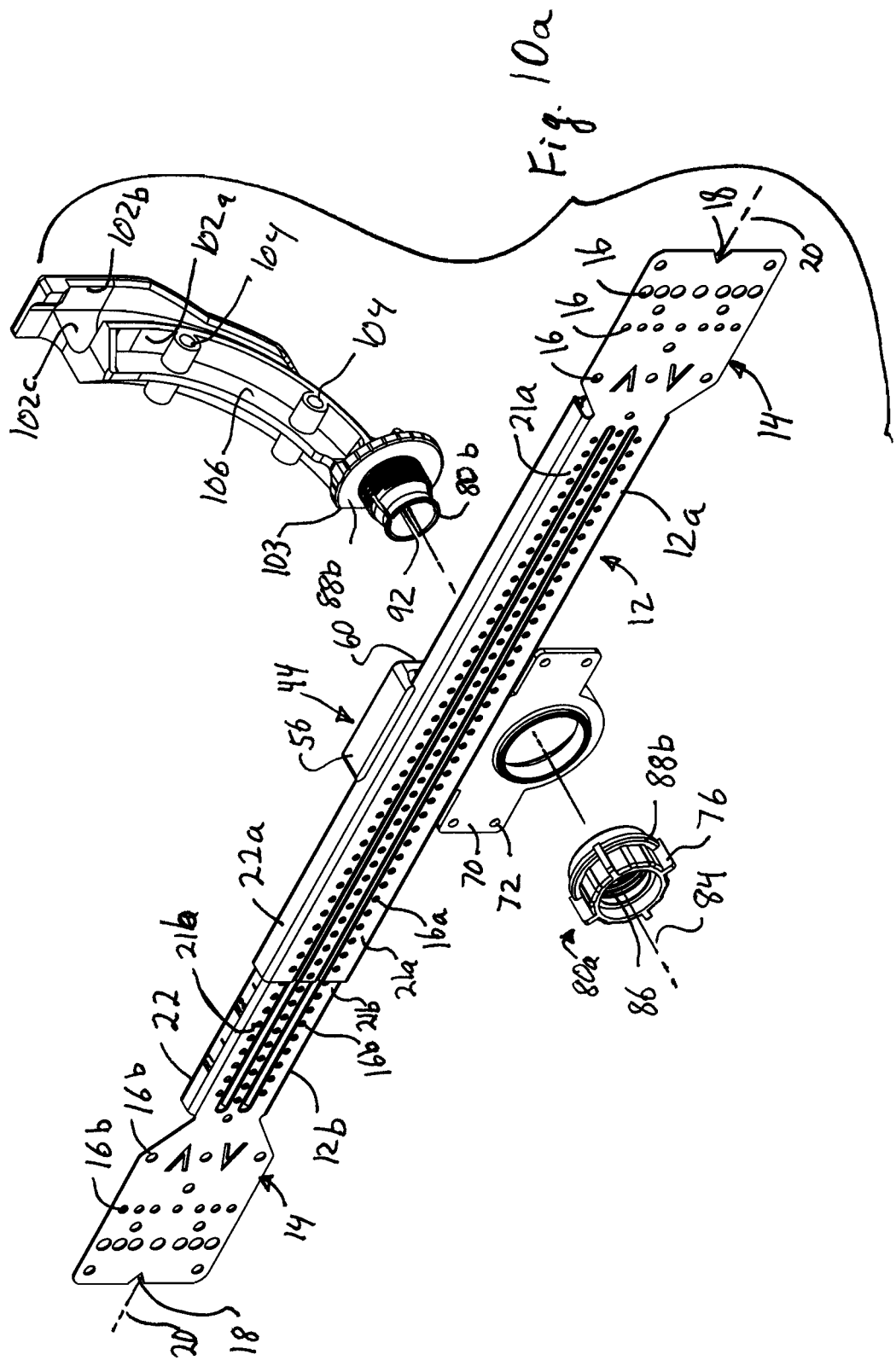

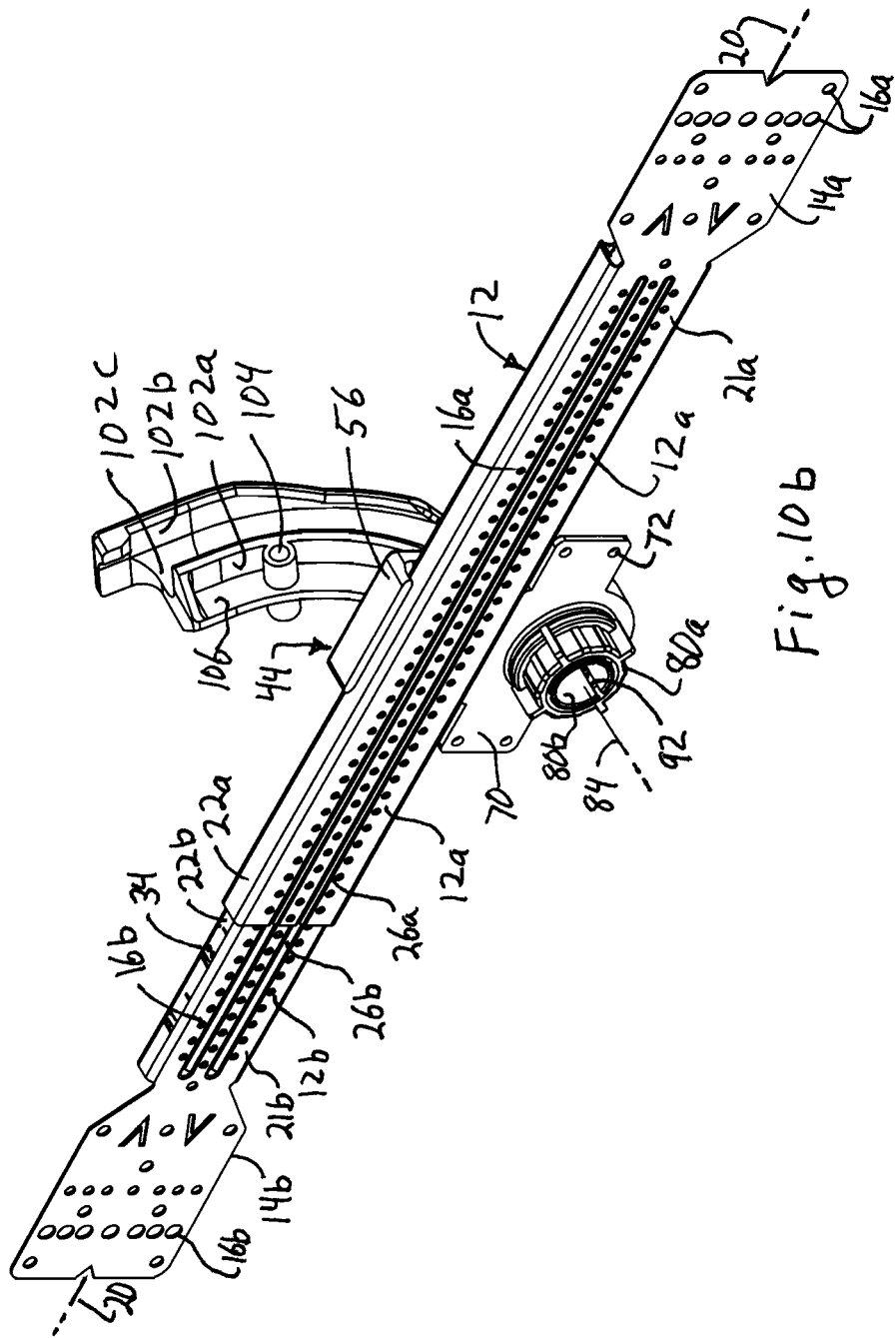

PIPE HOLDER AND SUPPORT

CROSS-REFERENCE TO RELATED APPLICATIONS

Not Applicable.

STATEMENT RE: FEDERALLY SPONSORED RESEARCH/DEVELOPMENT

Not Applicable.

BACKGROUND

Mounting plumbing fixtures in buildings requires positioning various holders at different locations. Longitudinally extendable, telescoping supports are frequently used to provide an adjustable length to accommodate variable stud spacing in buildings. But such brackets are often weak in torsion or twisting about the longitudinal axis along which the supports extend. There is thus a need for an improved bracket with adjustable length and torsional resistance.

In order to accommodate variable positioning of pipes and items along the length of structural supports, some brackets have a plurality of suitable connectors at fixed locations, allowing users to select the one closest to the desired position. But such brackets waste material by providing unused connectors and because these connectors are at predetermined locations, some misalignment may still arise. There is thus a need for an improved bracket that may be adjusted to the desired location between structural supports.

Some prior art brackets are complicated to use and require multiple operations and many hands to connect plumbing devices to the brackets. There is thus a need for an improved bracket that is easy to connect to plumbing devices and pipes.

BRIEF SUMMARY

A support for pipes and other plumbing fixtures is provided that uses a telescoping strut that extends between supports in a building. An elongated insert slides along a length of the struts, trapped within the C-shaped cross-section of the struts, with a threaded post extending outward from the insert and through a slot formed by the flanges of the C-shaped cross-section of the struts. A bracket fit which features a mating hole that fits over the post has two surfaces that abut and support opposing edges of the strut so the bracket doesn't rotate. A nut installed on the post urges the parts immovably together, clamping the flanges of the strut between the insert and the bracket. The bracket has a mounting portion extending therefrom to provide an opening through which a pipe passes, optionally, either directly above or below the strut. Two threaded mounting connector part with opposing ramped surfaces, encircle the pipe on opposing sides of the bracket and deform toward the pipe when tightened to clamp the pipe while also clamping against opposing sides of the mounting portion.

In more detail, there is advantageously provided a support assembly for mounting elongated members between supports in a building so that the elongated members extend along a longitudinal axis orthogonal to the building supports. The assembly includes an adjustable length strut having first and second elongated and telescoping strut segments. Each strut segment has an end mounting portion with at least one fastener hole therein and an open channel portion having a predetermined length. The channel portion includes a front plate, first and second opposing sides generally perpendicular to the front plate and a flange extending from a distal edge of each side and along the length of each side, the flanges being inclined toward each other and forming an elongated slot opposite the front.

An elongated insert fits inside either or both of the telescoping strut segments and further, dependent on its positioning along the length of the telescoping strut, and extends along a portion of the length of the channel. The insert has a threaded post extending between the flanges and out of the elongated slot. The insert is larger than the slot so it doesn't pull through the slot. The insert has at least one bracket connector recess adjacent to the post but spaced apart from the post a distance along a length of the channel. The assembly includes a bracket having first and second engaging portions extending over and adjacent to the first and second sides of the channel, respectively. The first and second engaging portions are joined by a back having a post opening sized and located so that the post fits through the post opening. The bracket has at least one bracket connector post located and configured to fit into the at least one bracket connector recess in the elongated insert. A fastener engages a distal end of the post to releasably clamp the flanges between the insert and the bracket. The bracket has a mounting portion extending along a portion of one side of the channel and into a general plane extending along the length of the channel. The mounting portion has a pipe opening therein encircling the longitudinal axis and pipe during use.

In further variations, the channel portion of each strut segment preferably has a C shaped cross-section with the flanges parallel to each other. The mounting portion of the bracket segment may include a flat mounting surface in a plane parallel to the front plate of one of the strut segments to which various fixtures can be fastened. The mounting portion preferably accepts the attachment of first and second mounting connector parts at least one of which is configured to pass through the pipe, opening with each mounting connector part having an annular inclined surface thereon located so that movement of one inclined surface toward the other in a direction parallel to the longitudinal axis deforms a portion of at least one mounting connector part toward the longitudinal axis. Further, the first mounting connector part may have an outwardly extending flange that abuts a first side of the bracket and also have a cylindrical skirt that fits through the pipe opening and has internal threads on the skirt. The second mounting connector part may have a slit cylindrical skirt with external threads engaging the internal threads so that rotation of one mounting connector part advances one of the mounting connector parts axially so that a segment of the slit cylindrical skirt moves toward the longitudinal axis. Additionally, the outwardly extending flange on one of the mounting connector parts may engage a portion of the bracket to restrain rotation of that engaged flange and the mounting connector part from which that engaged flange extends. The second connector may have a curved support connected thereto, where the curved support has one open curved side into which a tube can be laterally inserted.

There is also advantageously provided a kit for variably mounting selectable elongated members between supports in a building so the elongated members extend along a longitudinal axis orthogonal to the building supports. The kit optionally includes first and second elongated and telescoping strut segments where each strut segment has an end mounting portion with at least one fastener hole therein. The strut segments also have an open channel portion having a predetermined length where the channel portion is formed by a front plate, first and second opposing sides generally perpendicular to the front plate and a flange extending from a distal edge of each side and along the length of each side. The flanges are inclined toward each other and form an elongated slot opposite the front. The kit includes an elongated insert configured to fit inside either or both of the telescoping strut segments, depending on its location along the length of the telescoping strut. The insert has a length extending along a portion of the length of the channel during use and also has a threaded post that extends through the slot between the flanges. The insert is larger than the slot and has a height slightly smaller than the distance between the opposing sides of the inner strut. The insert has at least one bracket connector recess adjacent to the post but spaced apart from the post a distance along a length of the insert. The kit also includes a bracket that has first and second engaging portions configured to extend over and fit adjacent to the first and second sides of the channel, respectively. The first and second engaging portions are joined by a back that has a post opening sized and located so that the post may fit snugly through the post opening. The bracket has at least one bracket connector post located and configured to fit into the at least one bracket connector recess in the insert. The bracket has a mounting portion configured to extend along a portion of one side of the channel during use. The mounting portion is configured to extend into a general plane extending along the length of the channel during use and preferably, but optionally, below the strut. The mounting portion has a pipe opening therein that encircles the longitudinal axis during use. A fastener is also provided that is configured to threadingly engage a distal end of the post to releasably clamp the flanges between the insert and the bracket during use.

In further variations, each strut segment comprises a C shaped cross-section with the flanges parallel to each other. Additional variations of the various parts of the struts, insert and bracket are as described for the above described assembly and as further described below.

BRIEF DESCRIPTION OF THE DRAWINGS

These and other features and advantages of the invention will become more apparent in light of the following discussion and drawings, in which like numbers refer to like parts throughout, and in which:

FIG. 1 is an exploded perspective view of an extendable strut with a positionable insert and clamping bracket thereon;

FIG. 2a is a front perspective view of a slidable insert and post of the bracket of FIG. 1a;

FIG. 2b is a front plan view of the slidable insert and post of FIG. 2a;

FIG. 2c is a bottom plan view of the slidable insert and post of FIG. 2b;

FIG. 2d is a top plan view of the slidable insert and post of FIG. 2b;

FIG. 2e is a right side plan view of the slidable insert and post of FIG. 2b;

FIG. 2f is a left side plan view of the slidable insert and post of FIG. 2b;

FIG. 2g is a back side plan view of the slidable insert and post of FIG. 2b;

FIG. 3a is a perspective view of the clamping bracket of FIG. 1;

FIG. 3b is a front plan view of the clamping bracket of FIG. 3a;

FIG. 3c is a bottom plan view of the clamping bracket of FIG. 3b;

FIG. 3d is a top plan view of the clamping bracket of FIG. 3b;

FIG. 3e is a right side plan view of the clamping bracket of FIG. 3b;

FIG. 3f is a left side plan view of the clamping bracket of FIG. 3b;

FIG. 3g is a back plan view of the clamping bracket of FIG. 3b;

FIG. 4a is a plan view of the strut of FIG. 1;

FIG. 4b is a sectional view taken along section 4b-4b of FIG. 4a

FIG. 5a is a plan view of the assembly of FIG. 1;

FIG. 5b is a sectional view taken along section 5b-5b of FIG. 5a;

FIG. 6a is a plan view of the assembly of FIG. 1;

FIG. 6b is a sectional view taken along section 6b-6b of FIG. 6a;

FIG. 7 is a rear perspective view of the assembly of FIG. 1 and FIG. 5a;

FIG. 8a is an exploded perspective view of the strut and bracket of FIG. 1 with a clamping insert in the bracket;

FIG. 8b is an assembled view of the strut and bracket and clamping insert of FIG. 8a;

FIG. 9a is a plan view of the assembly of FIG. 8b;

FIG. 9b is a sectional view taken along section 9b-9b of FIG. 9a;

FIG. 10a is an exploded view of the strut and bracket of FIG. 1 with a curved mounting assembly;

FIG. 10b is an assembled view of the strut and bracket and curved mounting assembly of FIG. 10a.

DETAILED DESCRIPTION

Figure 7:
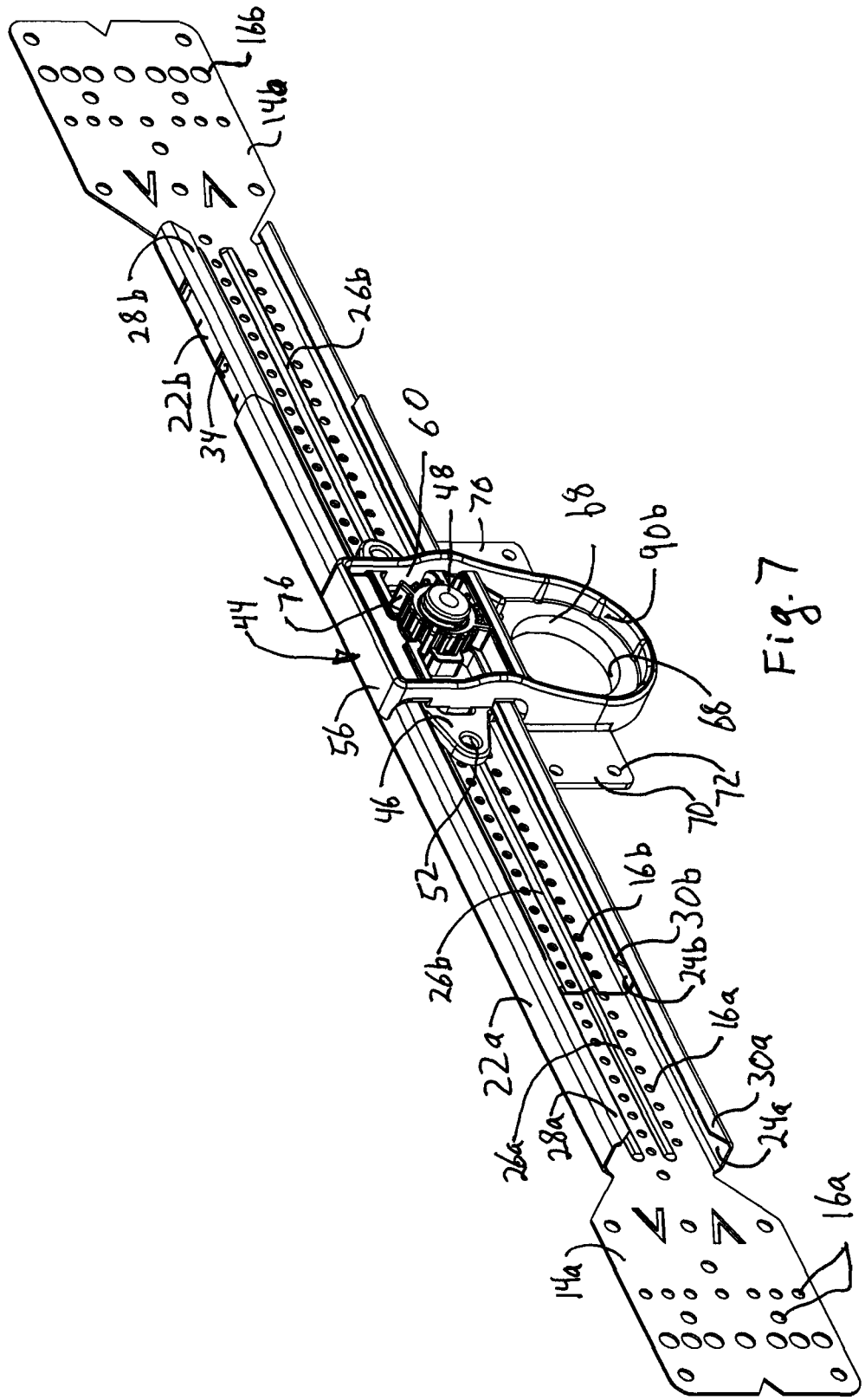

Referring to FIGS. 1-4b, a strut 12 is provided with first and second nested, telescoping strut segments 12a, 12b. The strut segments 12a, 12b each have a flat, fastening end 14a, 14b having a plurality of fastener holes 16a, 16b extending therethrough. The holes 16 may be differing size to accommodate different sized and types of fasteners, such as nails, screws or staples of varying sizes. Further, the holes 16 may be arranged in lines to facilitate bending the fastening end along predetermined lines. An alignment notch 18 may be formed in the distal end of the strut portion is optionally provided. The strut portions 12a, 12b are extendable along a longitudinal axis 20. Each strut segment 16a, 16b advantageously has a plurality of fastener holes 16a, 16b along a length of each respective strut segment, advantageously located in symmetrical patterns so the fastener holes 16a, 16b in overlapping portions of struts 14a, 14b may overlap and preferably align.

Each strut segment 12a, 12b has a front, generally rectangular strip or plate 21 from which extend upper and lower flanges 22, 24, respectively, with strut segment 12a having generally parallel sides 22a, 24a extending from front plate 21a and strut portion 12b having sides 22b, 24b extending from front plate 21b to form a generally U-shaped arrangement, preferably with rounded corners at the juncture of the sides 22, 24 with the front 21. The aligned holes 16a, 16b are formed in the front plates 21a, 21b, respectively. As used herein, the references to upper and lower, inner and outer are with respect to the orientation of the parts as shown in FIG. 1. The cross-section of the strut 12 can vary, but it preferably forms a C-section and thus upper side 22 has a depending flange 28 and lower flange has an upstanding flange 30, with edges flanges 28, 30 directed toward each other in the same plane, or inclined toward the opposing side 22, 24, or front 21 of the strut. The flanges 28, 30 are generally perpendicular to the sides 22, 24, and preferably have a rounded corner between the sides and flanges. The distal edges of flanges 28, 30 form an elongated slot between them, which slot runs the length of the channel of each strut 12a, 12b, ending where the fastening end tabs 14 begin. As seen in the figures, the end tabs 14 extend continuously without interruption from the front plate 21 of each strut segment 12. The strut segments 12 are typically formed from a single piece of sheet metal which is perforated, punched or otherwise cut to form fastener holes 16, bent or otherwise deformed to form ribs 26, with sides 22, 24 and flanges 28, 30 formed by bending.

Longitudinal stiffening ribs 26 in each of the strut segments 12a, 12b may extend parallel to longitudinal axis 20. Ribs having a V shaped cross section with a rounded bottom, a U-shaped cross section, or a semi-circular cross section are believed preferable.

The strut segments 12a, 12b nest together and slide along the longitudinal axis 20 to adjust the length of the strut 12. Thus, the ribs 26a, 26b in each strut segment 12a, 12b, respectively, are aligned so they nest with each other and slide relative to each other. In the depicted embodiment the strut segment 12b is the inner strut segment and nests inside the outer strut segment 12a. Since the struts nest within each other, the rib 26b in the inner strut segment 12a may be slightly larger than the rib 26a in the outer strut segment 12b so that the front faces 21a, 21b can abut one another.

As shown in FIG. 1, a series of printed indicia 34 may be provided on the front 21b, sides 22b, 24b, or flanges 26b, 28b of the inner strut segment 12b. The indicia 34 reflects the distance between the end of sides 22, 24, with the distal edge of the outer strut segment 12a nearest end 14b indicating which indicia is to be read as reflecting that distance. Thus, the distance indicia 34 on inner strut segment 12b has a smaller numerical value adjacent end 14b, with the distance indicia 34 increasing toward the opposing, distal end of the inner strut segment 12b. A portion of the distance indicia 34 are concealed from view by the overlapping outer strut segments 12a, so that the distal edge of the outer strut portion 12a cooperates with the location of the distance indicia 34 on inner strut 12b to reflect the correct distance between two specified points, one on each strut segment 12a, 12b. This arrangement allows users to position fastener holes 16a, 16b at specific distances from each other to accommodate studs of known or expected spacing. It also allows users to predetermine the length of the support strut 12 for an expected stud spacing. It further allows users to predetermine the position of the mounting bracket discussed later, relative to the strut 12.

Referring to FIGS. 1-7, a bracket assembly 40 is fastened to the strut 12. The bracket assembly has an insert 42 configured to move along the inside of the inner strut segment 12b and to releasably engage a bracket 44, the bulk of which is located on the outside of the strut. The insert 42 has an elongated slider plate 46 sized to fit within and move along the length of the inner strut segment 12b. The slider plate 46 advantageously has a generally rectangular shape with opposing and straight upper and lower upper edges spaced apart a distance slightly smaller than the distance between the upper and lower sides 22b, 24b. The length and height of the slider plate 46 determine how much the slider plate can tilt inside the inner strut segment, or rotate parallel to the plane of the front face 21. A slider plate 46 with a larger height and longer length reduce the tilting or rotation and provide a more stable and stronger assembly 40. But if the slider plate 46 is too long it cannot be positioned too close to one of the ends 14a, 14b, thus restricting use, and if the plate is too high it abuts the sides 22b, 24b and makes it difficult to position inside the inner strut 12b. Also, the slider plate 46 advantageously and selectably slides inside either the inner or outer strut segments 12b, 12a and fits tighter and rotates less when in the inner strut 12b than the outer strut 12a.

A post 48 extends orthogonally from one face of the slider plate 46 along an axis perpendicular to the front face 21 and ends 14. The post 48 is preferably a cylindrical post with exterior threads 50 and located preferably, but optionally, at the center of the plate. The post 48 is small enough to fit between both of the distal ends of flanges 28, 30 on the strut segments 12a, 12b. The slider plate 46 optionally has one or more fastener holes 52 at opposing ends, with the holes 52 preferably spaced laterally relative to the holes 16a, 16b so hole 52 on opposing ends of the slider plate 46 may align with holes 16a, 16b and allow a fastener to pass therethrough when those holes are so aligned. The fastener plate 46 also has at least one and preferably two bracket connector recesses 54 to the side of the post 48. As desired, stiffening gussets 55 may be provided for to the post 48 and spaced apart from the post. Radially opposed gussets 55 having an inclined juncture between the plate 46 and post 48 are shown, but other shapes and locations could be provided. The insert 42 has a thickness small enough to fit inside the inner strut segment 12b and allow the insert to slide along the length of the inner strut segment 12b, with the post 48 moving along the slot between the distal edges of strut flanges 28, 30. The insert 42 is preferably inserted from one end of the strut portion 12b and snuggly fits inside the inner strut 12b.

Still referring further to FIGS. 1-7, the bracket 44 wraps around three sides of the strut and thus has an upper support 56 and lower support 58 that are spaced apart a distance sized so that they may abut one or both of the outer surfaces of upper and lower sides 22, 24. The upper and lower supports 56, 58 thus have opposing upper and lower interior surfaces that face each other and may abut the upper and lower surfaces 22a, 24a of the outer strut 12a. But since the upper and lower surfaces 22b, 24b of the inner strut are closer together they may not abut the supports 56, 58. The upper and lower supports 56, 58 are connected by a back portion 60 having a post opening 62 located and shaped to receive the post 48 and to preferably receive stiffening gussets 55. The depicted opening 62 is circular to receive circular post 48, with short rectangular slots on opposing sides of the opening to receive stiffening gussets 55. At least one bracket connector posts 64 extends from the bracket 44 to the side of the opening 62 and is located and configured to mate with the at least one connector recesses 54 in the slider plate 46. The depicted connector posts 64 are rectangular in cross-section, with the long side vertically oriented, and the mating connector openings 54 are rectangular in shape and each sized to snugly receive one of the posts 64.

Below the lower support 58 is a depending portion 66 that may take various forms but is shown as having a wall defining a circular pipe opening 68 with an elongated mounting plate 70 extending from opposing sides of at least a portion of the pipe opening 68 and forming part of the wall defining the pipe opening 68. The elongated mounting plate 70 may have one or more fastener holes 72 therein, with the depicted embodiment showing four fastener holes 72 in opposing corners of a generally rectangular mounting plate 70. Preferably, the depending portion 66 is formed by a depending circular boss encircling and defining pipe opening 68 and having mounting plate 70 extending laterally from a first, front side of the mounting portion or circular boss. The depending portion 66 is preferably located below lower support 58 so that in use the connector portion 66 and the boss forming pipe opening 68 are below the strut 12, with the front of mounting plate 70 located in the same general plane as the front plate 21a, 21b of the strut 12, or slightly forward of that plane. However, in practice the entire assembly may easily be inverted so that depending portion 66 and pipe opening 68 are above the strut 12. The bracket 44 may be integrally cast or simultaneously molded of suitable plastic or other material.

The bracket assembly 40 may also include an annular locking nut 74 (FIG. 1) which has a circular opening with threads 50 configured to threadingly engage threads 50 on the mounting post 48. The nut 74 has an outer surface that includes a number of radially extending ribs 76. Preferably, the nut 74 has shorter and longer ribs 76 extending outward from the nut with four of the longer ribs 76 located 90 degrees apart. The ribs 76 provide a good manual gripping surface and the longer ribs make it easier to use fingers or tools such channel locks to rotate the nut 74.

Referring to FIGS. 1-7, in use, the slider plate 46 of insert 42 is inserted inside one of the struts 12a, 12b. The bracket 44 is then attached so the post 48 of the slider plate passes through the corresponding post opening 62 of the bracket 44, while the connector posts 64 fit into the mating connector recesses 54 in slider plate 46. The threaded lock nut 74 threadingly engages the threads 50 on post 48 to urge the back 60 of bracket 44 and slider insert 42 together. To assemble the bracket assembly 40, once the insert 42 is within the extension strut 12 the sides 22, 24 prevent the insert from rotating about the longitudinal axis of the post 48 so that the user can grab the post and use it to position the insert 42 along the length of the strut 12 to the desired position where it will be held in place by friction if the strut is generally horizontal or even at a significant incline of up to 30-45 degrees from the horizontal. The user can then, with one hand, fit bracket 44 into position with opening 62 passing over post 48 and upper and lower supports 56, 58 over the opposing sides 22, 24 of the strut 12. The supports 56, 58 serve to hold the bracket 44 in position against strut 12 in most commonly occurring arrangements of those parts. Again using one hand, the user can then fasten or tighten nut 74 on post 48 to lock the parts in the desired position. The sides 22, 24 of the strut 12 prevent the post 48 and insert 42 from rotating during tightening of the nut 74, and the supports 56, 58 restrain rotation of the bracket during tightening of nut 74. The gussets 55 optionally fits into slots extending outward from opening 62 in the bracket 44 in order to ensure alignment of the insert 42 and bracket 44 and to further restrain relative rotation of the bracket and insert about the axis of post 48. Further, the upper and lower supports 56, 58 prevent the bracket from rotating during tightening. By this arrangement, the flanges 28, 30 are interposed between the clamping parts of the insert 42 and bracket 44 so that clamping the insert to the bracket in turn clamps the insert 42, flanges 28, 30 (and thus struts 12a, 12b) and bracket 44 together. Advantageously the back 60 of the bracket 44 abuts flanges 28a, 30a and compresses them against flanges 28b, 30b and against slider plate 46 to lock the parts together.

While the nut 74 is loose enough on post 48 to allow movement of the insert 42 and bracket 44 as a unit along the length of the strut 12, the bracket assembly 40 can be positioned at any desired location along the length of the strut 12 and then the nut can be tightened to lock the parts together, using fingers, pliers or other wrenching tools as desired to increase tightness and the force with which the parts are clamped together. By using the distance indicia 2, the length of the struts 12a, 12b can be preset and fixed by tightening nut 74 on post 48. Likewise, the bracket assembly 40 can be placed at a predetermined location on the strut 12, with the strut 12 having a predetermined length, all by selective loosening and tightening of the nut 74 and positioning of the insert 42 and bracket 44. If the location of the bracket 44 needs adjustment during later installation the nut 74 can be loosened and the bracket 44 and insert 42 repositioned as needed. Advantageously, the entire bracket assembly 40 may be assembled separately from the strut 12 and attached at a later time by sliding the insert 42 into the channel of sides 22, 24 and flanges 28, 30 from one end of the strut.

The elongated interconnection between the insert 42 and bracket 44 via the post 48 and connector posts 64 provide a wide spaced connection and a long clamping length that increases stability and stiffness at the location of the insert and bracket. The slider plate 46 is preferably 2-4 inches long for struts 12a, 12b that are about 10-14 inches long. The top and bottom supports 56, 58 limit rotation of the bracket 44 in the plane of the strut 12 as the edges of those supports abuts the adjacent portions of the upper and lower sides 22, 24 of the strut 12 as the bracket rotates. The wider the bracket 44 the less rotation before the bracket abuts the strut 12. Thus, the wider bracket 44 also helps stabilize the strut 12 at the location of the bracket. The bracket 44 is preferably as wide as the spacing between the outer edges of the posts 64 which are advantageously located at opposing edges of the bracket 44 (excluding mounting plate 70. Further, during use the insert 42 and bracket 44 may be positioned so at least one of the lower sides of the slider plate 46 or the upper support 56 abuts the adjacent portion of the strut 12a, 12b to which the bracket assembly 40 is fastened. There is thus advantageously provided a way in which the strut portions 12a, 12b may be readily adjusted and held at a predetermined length before being fastened to building supports, and a way to easily and quickly reposition the bracket during preassembly or during use.

Further, the bracket 44 extends from the back side or rear side of the struts 12, to preferably, but optionally position the lower support 58 and the depending portion 66 directly below the strut 12. Advantageously the width of the pipe opening along the longitudinal axis through that opening is about the same is the width of the strut along that same axis. Thus, when the depending portion 66 depends from strut 12 to a position below and aligned with the strut 12 so as to be in the same general plane as the strut, then any weight placed on the depending portion 66 will be carried by the strut primarily in bending of the strut 12 in the plane along which it extends, rather than twisting of the strut 12 about the longitudinal axis 20. There is thus provided a more stable bracket and strut assembly for supporting pipes below the strut. The same rationale applies if the bracket and depending portion 66 are located above and in the same general plane as the strut 12, except slight offsets are more inclined toward any offset force causing an increasing offset and increased twisting. Thus, the depending portion 66 preferably depends from the strut 12.

Referring to FIGS. 1 and 5-9b, the depending portion 66 advantageously has a connector device engaging the depending portion 66 to hold elongated pipes, conduits or other tubes during use. A two-part, radial clamping device is preferred having first and second connector parts 80a, 80b with each connector part having an inclined, ramp surface 84a, 84b inclined in an opposing direction and located to abut as the connector part 80 moves toward each other along axis 84 through the pipe opening 68. During use the elongated pipe extends along axis 84, which axis is preferably orthogonal to the plane in which the strut 12 is located. The first connector part 80a is shown as an annular or generally cylindrical nut having a cylindrical skirt that in turn has an outer portion sized to fit inside and about the wall defining pipe opening 68. An inner side of the skirt has internal threads 86. The connector part 80a has an outward extending flange 88a, preferably extending radially outward. Gripping ridges or ribs 76 as described on nut 34 may be provided on the outer surface of the connector part 80a. The inclined surface 82a is an annular surface encircling axis 84, preferably forming a portion of a conical surface.

The second connector part 80b is shown as an annular or generally cylindrical bushing having a cylindrical skirt that has external threads 86 on an outer portion of the skirt, located to fit inside and engage internal threads 86 on the first connector part 80a. The skirt has an outer portion sized to fit inside and abut the wall defining pipe opening 68. The second connector part 80b has an outward extending flange 88b, preferably extending radially outward. The flange 88b may have a shaped periphery 90a cooperating with the mating recess 90b in the bracket 44 to restrain rotation. Non-circular mating shapes are suitable, as is the depicted use of ribs or grooves on periphery 90a mating with ribs or circular walls on bracket 44. Alternatively, gripping ribs 76 could be provided spaced apart from the flange for easy manual access. The inclined surface 82b is an annular surface encircling axis 84, preferably forming a portion of a conical surface and located radially outward of axis 84 to engage inclined surface 82a during use. One of the connector parts 80 has a slit skirt so the segments formed by slits 92 can move radially toward and away from axis 84 during use.

In use, the connector parts 80a, 80b are inserted through opening 68 from opposing sides of that pipe opening 68 until the threads 86 engage. As the connector parts 80a, 80b move toward each other, outer periphery 90a abuts mating surfaces 90b on bracket 44 to restrain rotation of the second connector part 80b, allowing further tightening by using only one hand to rotate ribs 76 on connector part 80a. The threads advance the ramps or inclined surfaces 82a, 82b along axis 84 and the inclined surfaces require one ramp to move radially. This causes the slit skirt to move radially inward toward axis 84 to clamp against a tube or pipe extending through the connector parts 80a, 80b. As seen in FIG. 9b, the connector parts 80 are sized so that threads on each connector part may be engaged without engaging the inclined ramps 82 to narrow the diameter of the opening through the connector parts and that allows the parts to be connected and a tube or pipe slipped through the opening encircled by the connector parts 80a, 80b before they are tightened to clamp against the inserted tube, pipe, conduit, etc. Outwardly extending lip 81a on slotted connector part 80b is resiliently urged outward as it passes inside connector part 80a, with the lip 81a snapping outward of an annular recess forming ledge 81b in connector part 80a to resist separating the parts once the lip 81a snaps over the ledge 81b and into the annular space forming that ledge 81b. If the opening 68 is not quite aligned with the pipe axis 84 so as to bend the pipe, the nut 74 can be loosened and the bracket 44 and insert 42 moved along the length of the strut 12 until the center of pipe opening 68 is aligned with the axis 84, at which point the nut 74 is tightened to hold the parts in their relative position. Then the connector parts 80a, 80b may be tightened to clamp the pipe to the bracket 44. The flanges 88a, 88b abut opposing sides of the bracket 44 on opposing sides of the pipe opening 68 to limit the tightening of the connector parts 80a, 80b. As desired, threaded fasteners can engage the fastener holes 72 in the mounting plate 70 to secure bracket assembly 40 to other objects or surfaces such as wood studs, or to further secure bracket 44 to the strut 12. Given the present disclosure, one skilled in the art could vary the location of the ramps 82, slits, and arrangement and location of the various mating parts of the connector parts 80.

Figure 8B:
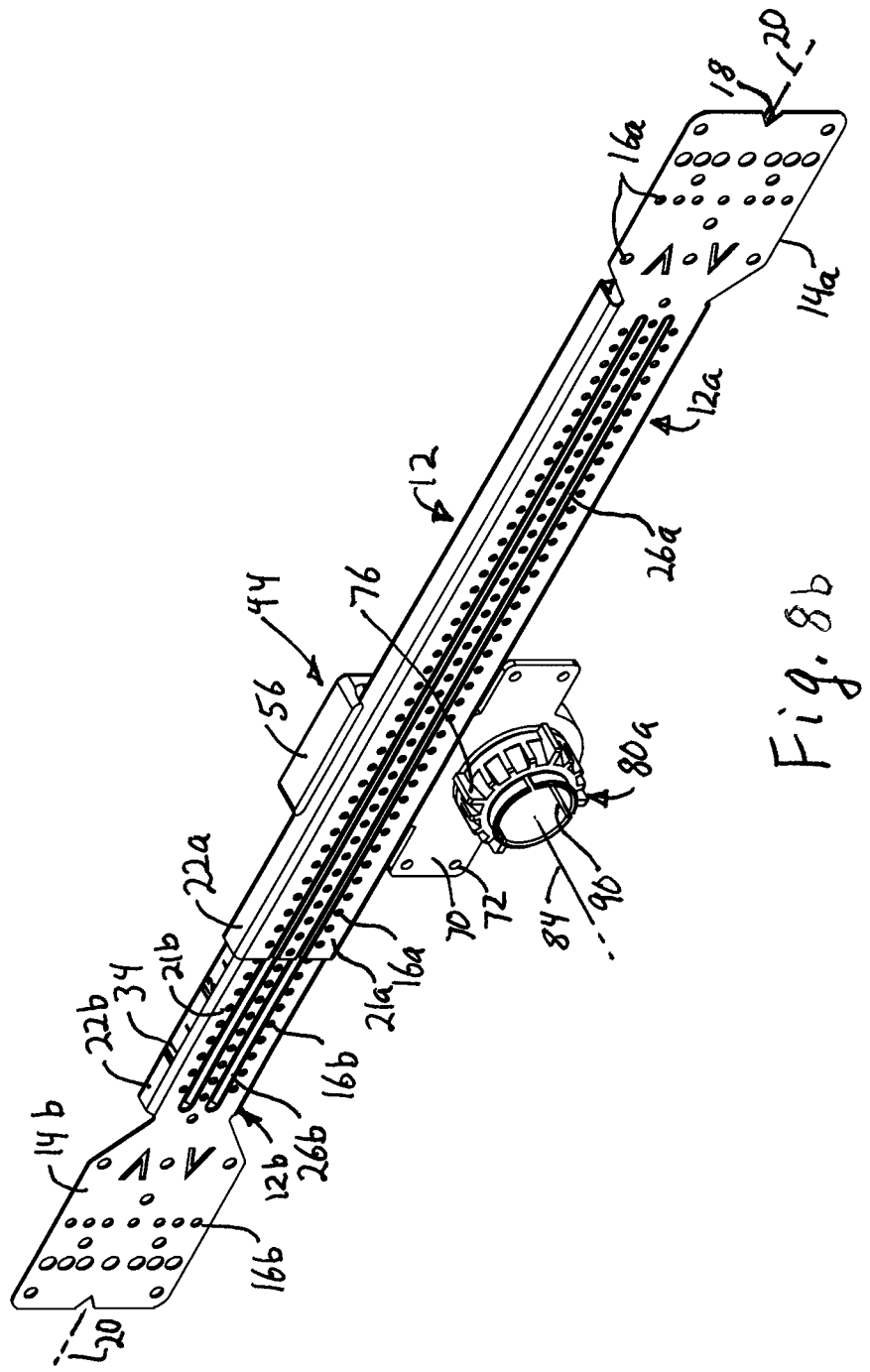

Referring to FIGS. 10a-10b, the pipe opening 68 may receive various types of devices. The connector part 80b is modified to extend from the end of a curved support 100 along which a pipe, conduit or other tube may be placed in order to guard against kinking from the bending caused by the curve. Such curved supports are described in further detail in U.S. Pat. No. 6,467,734, the complete contents of which are incorporated herein by reference. The curved support 100 in the orientation of FIG. 10 has upper and lower walls 102a, 102b joined by sidewall 102c. Part of the lower wall 102b adjacent radial flange 88b is removed to allow easier insertion of the tube into the curved support formed by sidewalls 102. The sidewalls 102a, 102b, 102c preferably join at curved junctures and are located relative to each other to receive a range of tubes and guide them along the curve defined by the sidewalls 102, without kinking. Fastener holes 104 generally parallel to the bottom sidewall 102a may be provided to allow the support to be fastened to building supports, such as wooden studs in a house. Referring to FIG. 8a, radially extending flange 88b inhibits pressing the side of the curved support 100 against a flat stud or holding surface. Thus, the removal of a chord section on one side of flange 88b is used to create a flat side 103 on radial flange 88b in order to allow flush placement of curved support 100 against a building strut. A stiffening rib 106 extending along a length of the top side 102a may optionally be provided.

In the above depicted embodiments the flanges 28, 30 are preferably in the same general plane or parallel planes. If the flanges 28, 30 are inclined toward the face 21, the shape of the supports 56, 58 are preferably altered to conform to the shape of the flanges, as are the shape of the abutting portions of the slider plate 46 by forming a mating, inclined surface along opposing upper and lower sides of the slider plate 46. The conforming shapes allow tightening of nut 74 on post 48 to clamp the flanges 28, 30 between the insert 42 (via slider plate 46) and the bracket 44.

Figure 11:
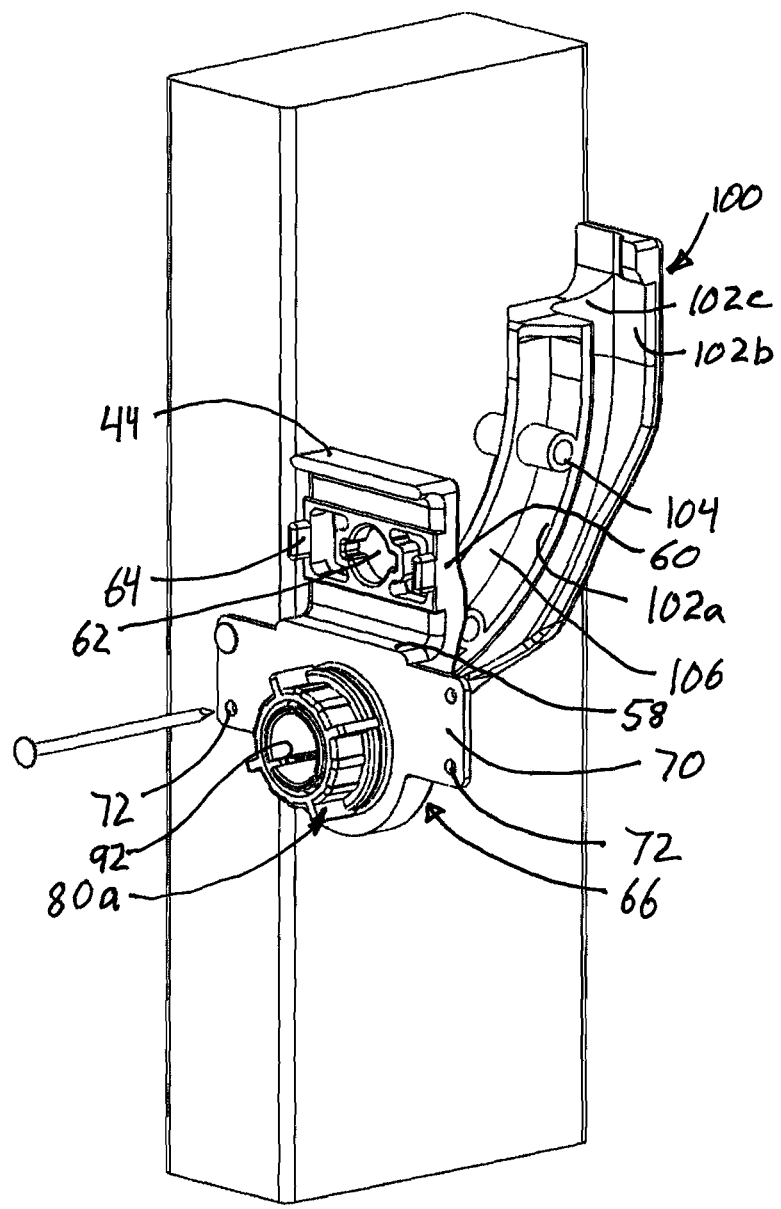
FIG. 11 is a perspective view of the bracket assembly of FIG. 1 fastened to a building stud without a support strut and slider plate.

Referring to FIG. 11, the bracket assembly 40 may be fastened to a building support such as a wooden stud by a fastener such as nails or screws passing through the fastener holes 72 in mounting plate 70. The curved support 100 is especially useful with the bracket assembly 40. The slider plate may be removed and discarded for this application, especially if the slider plate extends beyond the edge of the building stud and mounting plate 70. Thus, the bracket assembly 40 may advantageously be used without the strut.

The insert 42, bracket 44 and connector part 80 are preferably separate parts each molded of suitable plastic material, such as ABS or PVC plastic. Each part is thus integrally formed in that it is formed of a single piece of material. Given the present disclosure, one skilled in the art can make several revisions of the parts. Thus, if desired, the connector posts 64 may be located on the insert 42 and the mating recesses 54 may be located on the bracket 44.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious, modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A support assembly for mounting elongated members between supports in a building so the elongated members extend along a longitudinal axis comprising:
   an adjustable length strut having first and second elongated and telescoping strut sections, each strut section having an end mounting portion with at least one fastener hole therein, each strut section having an open channel portion having a predetermined length, the channel portion formed by a front plate, first and second opposing sides generally perpendicular to the front plate and having a length, and a flange extending from a distal edge of each side and along a portion of the length of each side, the flanges being inclined toward each other and forming an elongated slot opposite the front,
   an elongated insert fitting inside each of the telescoping strut sections and extending along a portion of the predetermined length of the channel, the insert having a post extending therefrom between the flanges and out of the elongated slot with the insert being larger than the slot, the insert having a bracket connector recess on at least one side of the post and spaced apart from the post a distance along a portion of the predetermined length of the channel;
   a bracket having first and second engaging portions extending over and adjacent to the first and second sides of the channel, respectively, the first and second engaging portions being joined by a back having a post opening sized and located so that the post fits through the post opening, the bracket having at least one bracket connector post located and configured to fit into the bracket connector recess, a fastener engaging a distal end of the post to releasably clamp the flanges between the insert and the bracket, the bracket having a mounting portion extending along a portion of one side of the channel and into a general plane extending along the predetermined length of the channel and defining a pipe opening therein encircling a longitudinal axis of the pipe during use.

2. The support assembly of claim 1, wherein the channel portion of each strut section comprises a C shaped cross-section with the flanges parallel to each other.

3. The support assembly of claim 1, wherein the mounting portion further includes a flat mounting surface in a plane parallel to the front plate of one of the strut sections.

4. The support assembly of claim 1, wherein there are two bracket connector recesses each located on an opposing side of the post when the bracket is connected to the insert and wherein there are two bracket connector posts each located on opposing sides of the post when the bracket is connected to the insert.

5. The support assembly of claim 1, wherein the mounting portion includes first and second mounting connector parts at least one of which is configured to pass through the pipe opening, each mounting connector part having an annular inclined surface thereon located so that movement of one inclined surface relative to the other in a direction parallel to the longitudinal axis of the pipe, deforms a portion of one mounting connector part toward the longitudinal axis of the pipe.

6. The support assembly of claim 5, wherein the first mounting connector has an outwardly extending flange that abuts a first side of the bracket and a cylindrical skirt fitting through the pipe opening with internal threads on the skirt and the second mounting connector has a slit cylindrical skirt with external threads engaging the internal threads, rotation of one mounting connector advancing one of the mounting connectors axially so a segment of the slit cylindrical skirt moves toward the longitudinal axis of the pipe.

7. The support assembly of claim 6, wherein an outwardly extending flange on one of the mounting connector parts engages a portion of the bracket to restrain rotation of that engaged flange and the mounting connector part from which that engaged flange extends.

8. The support assembly of claim 6, wherein the second connector part has a curved support connected thereto, the curved support having one open curved side into which a tube can be inserted laterally.

9. The support assembly of claim 5 wherein the channel portion of each strut section comprises a C shaped cross-section with the flanges parallel to each other;
   and wherein the mounting portion includes first and second mounting connector parts at least one of which is configured to pass through the pipe opening, each mounting connector part having an annular inclined surface thereon located so that movement of one inclined surface relative to the other in a direction parallel to the longitudinal axis of the pipe deforms a portion of one mounting connector part toward the longitudinal axis of the pipe; and
   wherein the first mounting connector part has an outwardly extending flange that abuts a first side of the bracket and a cylindrical skirt fitting through the pipe opening with internal threads on the skirt and the second connector has a slit cylindrical skirt with external threads engaging the internal threads, rotation of one mounting connector parts advancing one of the mounting connector parts axially so a segment of the slit cylindrical skirt moves toward the longitudinal axis of the pipe; and
   wherein the post has external threads engaging internal threads of a fastener to selectively move the post toward the bracket and releasably clamp the flanges between the insert and the bracket.

10. A kit for mounting elongated members between supports in a building so the elongated members extend along a longitudinal axis, the kit comprising:
    first and second elongated and telescoping strut sections, each strut section having an end mounting portion with at least one fastener hole therein, each strut section having an open channel portion having a predetermined length, the channel portion formed by a front plate, first and second opposing sides generally perpendicular to the front plate and a flange extending from a distal edge of each side and along a length of each side, the flanges being inclined toward each other and forming an elongated slot opposite the front,
    an elongated insert configured to fit inside either of the telescoping strut sections and having a length extending along a portion of the predetermined length of the channel during use, the insert having a post extending therefrom and sized to fit through the slot between the flanges, the insert being larger than the slot and having a height slightly smaller than the distance between the opposing sides of a smaller of the first and second strut sections, the insert having a connector recess on at least one side of the post spaced apart a distance from the post along a length of the insert;
    a bracket having first and second engaging portions configured to extend over and fit adjacent to the first and second sides of the channel, respectively, the first and second engaging portions being joined by a back having a post opening sized and located so that the post may fit snugly through the post opening, the bracket having at least one bracket connector post located and configured to fit into the connector recess, the bracket having a mounting portion configured to extend along a portion of one side of one of the channels during use, the mounting portion configured to extend into a general plane extending along the predetermined length of the channel during use, the mounting portion defining a pipe opening therein encircling the longitudinal axis of the pipe during use; and a fastener configured to threadingly engage a distal end of the post to releasably clamp the flanges between the insert and the bracket during use.

11. The kit of claim 10, wherein the channel portion of each strut section comprises a C shaped cross-section with the flanges parallel to each other.

12. The kit of claim 10, wherein the mounting portion further includes a flat mounting surface configured to be located in a plane parallel to the front plate of one of the strut sections during use of the kit.

13. The kit of claim 10, wherein there are two connector recesses each located on an opposing side of the post when the bracket is connected to the insert.

14. The kit of claim 11, wherein the mounting portion includes first and second mounting connector parts at least one of which is configured to pass through the pipe opening, each mounting connector part having an annular inclined surface thereon located so that movement of one inclined surface relative to the other in a direction parallel to the longitudinal axis of the pipe deforms a portion of one mounting connector part toward the longitudinal axis of the pipe.

15. The kit of claim 14, wherein the first mounting connector part has an outwardly extending flange that abuts a first side of the bracket during use and further has a cylindrical skirt fitting through the pipe opening, the first mounting connector part having internal threads on the skirt and the second mounting connector parts having a slit cylindrical skirt with external threads thereon configured to threadingly engage the internal threads such that during use rotation of one mounting connector parts advances one of the mounting connector parts axially so a segment of the slit cylindrical skirt moves toward the longitudinal axis of the pipe.

16. The kit of claim 14, wherein an outwardly extending flange on one of the mounting connector parts engages a portion of the bracket to restrain rotation of that engaged flange and the mounting connector part from which that engaged flange extends.

17. The kit assembly of claim 16, wherein the second mounting connector part has a curved support connected thereto, the curved support having one open curved side into which a tube can be inserted laterally.

18. The support assembly of claim 11 wherein the channel portion of each strut section comprises a C shaped cross-section with the flanges parallel to each other;

and wherein the mounting portion includes first and second mounting connector parts at least one of which is configured to pass through the pipe opening, each mounting connector part having an annular inclined surface thereon located so that movement of one inclined surface relative to the other in a direction parallel to the longitudinal axis of the pipe deforms a portion of one mounting connector part toward the longitudinal axis of the pipe; and wherein the first mounting connector part has an outwardly extending flange that abuts a first side of the bracket and a cylindrical skirt fitting through the pipe opening with internal threads on the skirt and the second mounting connector parts has a slit cylindrical skirt with external threads engaging the internal threads, rotation of one mounting connector parts advancing one of the mounting connector parts axially so a segment of the slit cylindrical skirt moves toward the longitudinal axis of the pipe; and wherein the post has external threads engaging internal threads of a fastener to selectively move the post toward the bracket and releasably clamp the flanges between the insert and the bracket.

19. The kit of claim 15, wherein the mounting connector part with a slit skirt has an outwardly extending lip resiliently urged outward past an annular lip on the other mounting connector part to hold the two mounting connector parts together.

* * * * *